US010764048B2

(12) United States Patent
Joye et al.

(10) Patent No.: US 10,764,048 B2
(45) Date of Patent: Sep. 1, 2020

(54) PRIVACY-PRESERVING EVALUATION OF DECISION TREES

(71) Applicant: NXP B.V., Eindhoven (NL)

(72) Inventors: Marc Joye, San Jose, CA (US);
Fariborz Salehi, San Jose, CA (US)

(73) Assignee: NXP B.V., Eindhoven (NL)

( * ) Notice: Subject to any disclaimer, the term of this patent is extended or adjusted under 35 U.S.C. 154(b) by 270 days.

(21) Appl. No.: 15/849,334

(22) Filed: Dec. 20, 2017

(65) Prior Publication Data
US 2019/0190714 A1    Jun. 20, 2019

(51) Int. Cl.
*H04L 9/14* (2006.01)
*H04L 9/00* (2006.01)
(Continued)

(52) U.S. Cl.
CPC ............... *H04L 9/14* (2013.01); *G06F 17/10* (2013.01); *G06K 9/6227* (2013.01); *H04L 9/008* (2013.01); *H04L 2209/04* (2013.01)

(58) Field of Classification Search
CPC ...... H04L 9/088; H04L 9/3218; H04L 9/3231
See application file for complete search history.

(56) References Cited

U.S. PATENT DOCUMENTS 9,632,851 B1 *  4/2017  Johansson ........... G06F 21/6218
9,787,647 B2 * 10/2017  Wu ..................... H04L 63/0428
(Continued)

OTHER PUBLICATIONS

D. J. Wu, T. Feng, M. Naehrig, K. Lauter. Privately Evaluating Trees and Random Forest. In Proceedings on Privacy Enhancing Technologies, (2016), v. 2016, No. 4, pp. 335-355. (Year: 2016).*
(Continued)

*Primary Examiner* — Michael R Vaughan
*Assistant Examiner* — Vladimir I Gavrilenko

(57) ABSTRACT

A method for performing a secure evaluation of a decision tree, including: receiving, by a processor of a server, an encrypted feature vector $[\![x]\!]=([\![x_1]\!], \ldots, [\![x_n]\!])$ from a client; choosing a random mask $\mu_0$; calculating $[\![m_0]\!]$ and sending $[\![m_0]\!]$ to the client, wherein $[\![m_0]\!]=[\![x_{i_0}^{(0)}-t_0^{(0)}+\mu_0]\!]$ and $t_0^{(0)}$ is a threshold value in the first node in the first level of a decision tree $\mathcal{T}'$; performing a comparison protocol on $m_0$ and $\mu_0$, wherein the server produces a comparison bit $b_0$ and the client produces a comparison bit $b'_0$; choosing a random bit $s_0 \in \{0,1\}$ and when $s_0=1$ switching a left and right subtrees of $\mathcal{T}'$; sending $b_0 \oplus s_0$ to the client; and for each level $\ell=1, 2, \ldots, d-1$ of the decision tree $\mathcal{T}'$, where d is the number of levels in the decision tree $\mathcal{T}'$, perform the following steps: receiving from the client $[\![y_k]\!]$ where k=0, 1, ..., $2^\ell-1$; performing a comparison protocol on $m_\ell$ and $\mu_\ell$, wherein $\mu_\ell$ is a random mask and $m_\ell$ is based upon, $[\![x]\!]$, $t_k^{(\ell)}$, $[\![y_k]\!]$, and $\mu_\ell$ and the server produces a comparison bit $b_\ell$ and the client produces a comparison bit $b'_\ell$; choosing a random bit $s_\ell \in \{0,1\}$ and when $s_\ell=1$ switching all left and right subtrees at level $\ell$ of $\mathcal{T}'$; and sending $b_\ell \oplus s_\ell$ to the client.

22 Claims, 2 Drawing Sheets

CLIENT

INPUT:  $y_k$ (FOR $0 \le k \le 2^\ell - 1$)

SERVER $[\![x_{i_k}(\ell)]\!], t_k^{(\ell)}, [\![y_k]\!]]$ (FOR $0 \le k \le 2^\ell - 1$)

1. CHOOSE A RANDOM MASK $\mu_\ell$

2. COMPUTE <<$m_\ell$>> WHERE $m_\ell = \mu_\ell + \sum_{k=0}^{2^\ell-1} y_k(x_{i_k}(\ell) - t_k^{(\ell)})$ 3. SEND <<$m_\ell$>> TO CLIENT <<$m_\ell$>>
←

4. DECRYPT <<$m_\ell$>> AND GET $m_\ell$

5. CLIENT AND SERVER ENGAGE IN A COMPARISON PROTOCOL (E.G., THE BGK + PROTOCOL) ON INPUT $m_\ell$ FOR THE CLIENT AND $\mu_\ell$ FOR THE SERVER

←→

OUTPUT:  $b'_\ell$ $b_\ell$

(51) Int. Cl.
*G06F 17/10* (2006.01)
*G06K 9/62* (2006.01)

(56) References Cited

U.S. PATENT DOCUMENTS

2014/0372769 A1* 12/2014 Kerschbaum ........... H04L 9/008
 713/189
2019/0020477 A1* 1/2019 Antonatos ............... G06F 21/64

OTHER PUBLICATIONS

Boneh et al., Evaluating 2-DNF formulas on ciphertexts. J. Kilian, editor, Theory of Cryptography (TCC 2005), vol. 3378 of Lecture Notes in Comp. Sci., pp. 325-341.
Wu et al., Privately evaluating decision trees and random forests, Proc. on Privacy Enhancing Technologies, 2016(4):33.
Damgård et al. 'Efficient and secure comparison for on-line auctions'. Intl J. of Cryptography (and correction) 1(4): 323-324 (2009).
Damgård et al. Homomorphic encryption and secure comparison. Intl J. of Appl Cryptography, 1(1):22-31, 2008.
T.Veugen, Improving the DGK comparison protocol, 2012 IEEE Intl Workshop on Information Forensics and Security (WIFS 2012), pp. 49-54, IEEE, 2012.
Erkin, Privacy-Preserving Face Recognition, Privacy Enhancing Technologies (PETS 2009) vol. 5672 of Lect.Notes in Comp. Sci., pp. 235-253 (2009).
Barni, Mauro et al.; "Secure Evaluation of Private Linear Branching Programs with Medical Applications," European Symposium on Research in Computer Security (ESORICS 2009); Published Sep. 2009; LNCS vol. 5789; pp. 424-439.
Brickell, Justin et al.; "Privacy-Preserving Remote Diagnostics," CCS '07, Proceedings of the 14th ACM Conference on Computer and Communications Security; Oct. 2007; pp. 498-507; https://doi.org/10.1145/1315245.1315307.
Bost, Raphael et al.; "Machine Learning Classification Over Encrypted Data," NDSS (Network and Distributed Security Symposium); Feb. 8-11, 2015, San Diego, California System.
Damgard, Ivan et al. A Correction to 'Efficient and Secure Comparison for On-Line Auctions', International Journal of Cryptography; Aug. 2009; vol. 1, No. 4; https://doi.org/10.1504/IJACT.2009.028031.
Paillier, Pascal; "Public-Key Cryptosystems Based on Composite Degree Residuosity Classes;" Advances in Cryptology—EUROCRYPT '99 International Conference on the Theory and Application of Crypographic Techniques; May 2-6, 1999, Prague, Czech Republic; DOI: 10.1007/3-540-48910-X_16.

* cited by examiner

_US 10,764,048 B2_

PRIVACY-PRESERVING EVALUATION OF DECISION TREES

TECHNICAL FIELD

Various exemplary embodiments disclosed herein relate generally to a method and apparatus for performing a privacy preserving evaluation of decision trees.

BACKGROUND

Protocols have been developed for comparing private values using homomorphic encryption. These protocols may be used in the evaluation of decision trees. Embodiments improving upon the state of the art will be described below.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for performing a secure evaluation of a decision tree, including: receiving, by a processor of a server, an encrypted feature vector $[\![x]\!]=([\![x_1]\!], \ldots, [\![x_n]\!])$ from a client, where n is an integer, wherein $[\![x]\!]$ denotes an additively homomorphic encryption of x using a cryptographic key of the second party; choosing a random mask $\beta_0$; calculating $[\![m_0]\!]$ and sending $[\![m_0]\!]$ to the client, wherein $[\![m_0]\!]=[\![x_{i_0^{(0)}}-t_0^{(0)}+\mu_0]\!]$ and $x_{i_0^{(0)}}$ is the value of entry $i_0^{(0)}$ of the feature vector x ($1 \le i_0^{(0)} \le n$), and $t_0^{(0)}$ is a threshold value in the first node in the first level of a decision tree $\mathcal{T}'$; performing a comparison protocol on $m_0$ and $\mu_0$, wherein the server produces a comparison bit $b_0$ and the client produces a comparison bit $b'_0$; choosing a random bit $s_0 \in \{0,1\}$ and when $s_0=1$ switching a left and right subtrees of $\mathcal{T}'$; sending $b_0 \oplus s_0$ to the client; and for each level $\ell=1, 2, \ldots, d-1$ of the decision tree $\mathcal{T}'$, where d is the number of levels in the decision tree $\mathcal{T}'$, perform the following steps: receiving from the client $[\![y_k]\!]$ where $k=0, 1, \ldots, 2^\ell -1$; performing a comparison protocol on $m_\ell$ and $\mu_\ell$, wherein $\mu_\ell$ is a random mask and $m_\ell$ is based upon $[\![x]\!]$, $t_k^{(\ell)}$, $[\![y_k]\!]$, and $\mu_\ell$ and the server produces a comparison bit $b_\ell$ and the client produces a comparison bit $b'_\ell$; choosing a random bit $s_\ell \in \{0,1\}$ and when $s_\ell=1$ switching all left and right subtrees at level $\ell$ of $\mathcal{T}'$; and sending $b_\ell \oplus s_\ell$ to the client.

Further various embodiments relate to a non-transitory machine-readable storage medium encoded with instructions for performing a secure evaluation of a decision tree, including: instructions for receiving, by a processor of a server, an encrypted feature vector $[\![x]\!]=([\![x_1]\!], \ldots, [\![x_n]\!])$ from a client, where n is an integer, wherein $[\![x]\!]$ denotes an additively homomorphic encryption of x using a cryptographic key of the second party; instructions for choosing a random mask $\mu_0$; instructions for calculating $[\![m_0]\!]$ and sending $[\![m_0]\!]$ to the client, wherein $[\![m_0]\!]=[\![x_{i_0^{(0)}}-t_0^{(0)}+\mu_0]\!]$ and $x_{i_0^{(0)}}$ is the value of entry $i_0^{(0)}$ of the feature vector x ($1 \le i_0^{(0)} \le n$), and $t_0^{(0)}$ is a threshold value in the first node in the first level of a decision tree $\mathcal{T}'$; instructions for performing a comparison protocol on $m_0$ and $\mu_0$, wherein the server produces a comparison bit $b_0$ and the client produces a comparison bit $b'_0$; instructions for choosing a random bit $s_0 \in \{0,1\}$ and when $s_0=1$ switching a left and right subtrees of $\mathcal{T}'$; instructions for sending $b_0 \oplus s_0$ to the client; and for each level $\ell=1, 2, \ldots, d-1$ of the decision tree $\mathcal{T}'$, where d is the number of levels in the decision tree $\mathcal{T}'$, perform the following instructions: instructions for receiving from the client $[\![y_k]\!]$ where $k=0, 1, \ldots, 2^\ell -1$; instructions for performing a comparison protocol on $m_\ell$ and $\mu_\ell$, wherein $\mu_\ell$ is a random mask and $m_\ell$ is based upon $[\![x]\!]$, $t_k^{(\ell)}$, $[\![y_k]\!]$, and $\mu_\ell$ and the server produces a comparison bit $b_\ell$ and the client produces a comparison bit $b'_\ell$; instructions for choosing a random bit $s_\ell \in \{0,1\}$ and when $s_\ell=1$ switching all left and right subtrees at level $\ell$ of $\mathcal{T}'$; and instructions for sending $b_\ell \oplus s_\ell$ to the client.

Various embodiments are described, wherein when the server engages in a 1-out-of-$2^d$ oblivious transfer with the client to learn the value of $\mathcal{T}'(x)$.

Various embodiments are described, wherein when the client computes $r=(\beta_0, \beta_1, \ldots, \beta_{d-1})_2$ which is the index of the leaf node in $\mathcal{T}'$ indicating the output of the decision tree and where $\beta_\ell = b'_\ell \oplus b_\ell \oplus s_\ell$.

Various embodiments are described, wherein the first encryption uses the Pallier cryptosystem.

Various embodiments are described, wherein performing a comparison protocol on $m_\ell$ and $\mu_\ell$, further includes: choosing, by the server, $2^\ell$ random masks $r_k^{(\ell)}$ for $0 \le k \le 2^\ell - 1$, and a random mask $\mu_\ell$; computing $[\![M_\ell]\!] = [\![\sum_{k=0}^{2^\ell-1} y_k r_k^{(\ell)} - \mu_\ell]\!]$; computing for $0 \le k \le 2^\ell - 1$ $[\![z_k^{(\ell)}]\!]$ where $z_k^{(\ell)} = x_{i_k^{(\ell)}} - t_k^{(\ell)} + r_k^{(\ell)}$; and sending $[\![M_\ell]\!]$ and $[\![z_0^{(\ell)}]\!], \ldots, [\![z_{2^\ell-1}^{(\ell)}]\!]$ to the client.

Various embodiments are described, wherein performing a comparison protocol on $m_\ell$ and $\mu_\ell$, further includes: decrypting, by the client, $[\![M_\ell]\!]$ to get $M_\ell$; and computing, by the client, $m_\ell = \sum_{k=0}^{2^\ell-1} y_k z_k - M_\ell$.

Various embodiments are described, wherein performing a comparison protocol on $m_\ell$ and $\mu_\ell$, further includes: choosing, by the server, a random mask $\mu_\ell$; computing $\ll m_\ell \gg$ where $m_\ell = \mu_\ell + \sum_{k=0}^{2^\ell-1} y_k (x_{i_k^{(\ell)}} - t_k^{(\ell)})$, $\ll w \gg$ denotes a second homomorphic encryption of w using a cryptographic key of the second party; and sending $\ll m_\ell \gg$ to the client.

Various embodiments are described, wherein performing a comparison protocol on $m_\ell$ and $\mu_\ell$, further comprises, decrypting, by the client, $\ll m_\ell \gg$ to get $\mu_\ell$.

Various embodiments are described, wherein the second encryption uses the Boneh-Goh-Nissim (BGN) cryptosystem.

Various embodiments are described, wherein the second encryption uses a somewhat homomorphic cryptosystem.

Various embodiments are described, wherein for each level $\ell=1, 2, \ldots, d-1$ of the decision tree $\mathcal{T}'$ the client computes $y_k=1\{\beta^{(\ell)}=k\}$, where $\beta^{(\ell)} = \sum_{i=0}^{\ell-1} \beta_i 2^{\ell-i-1}$, encrypts $y_k$ resulting in $[\![y_k]\!]$, and sending $[\![y_k]\!]$ to the server.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
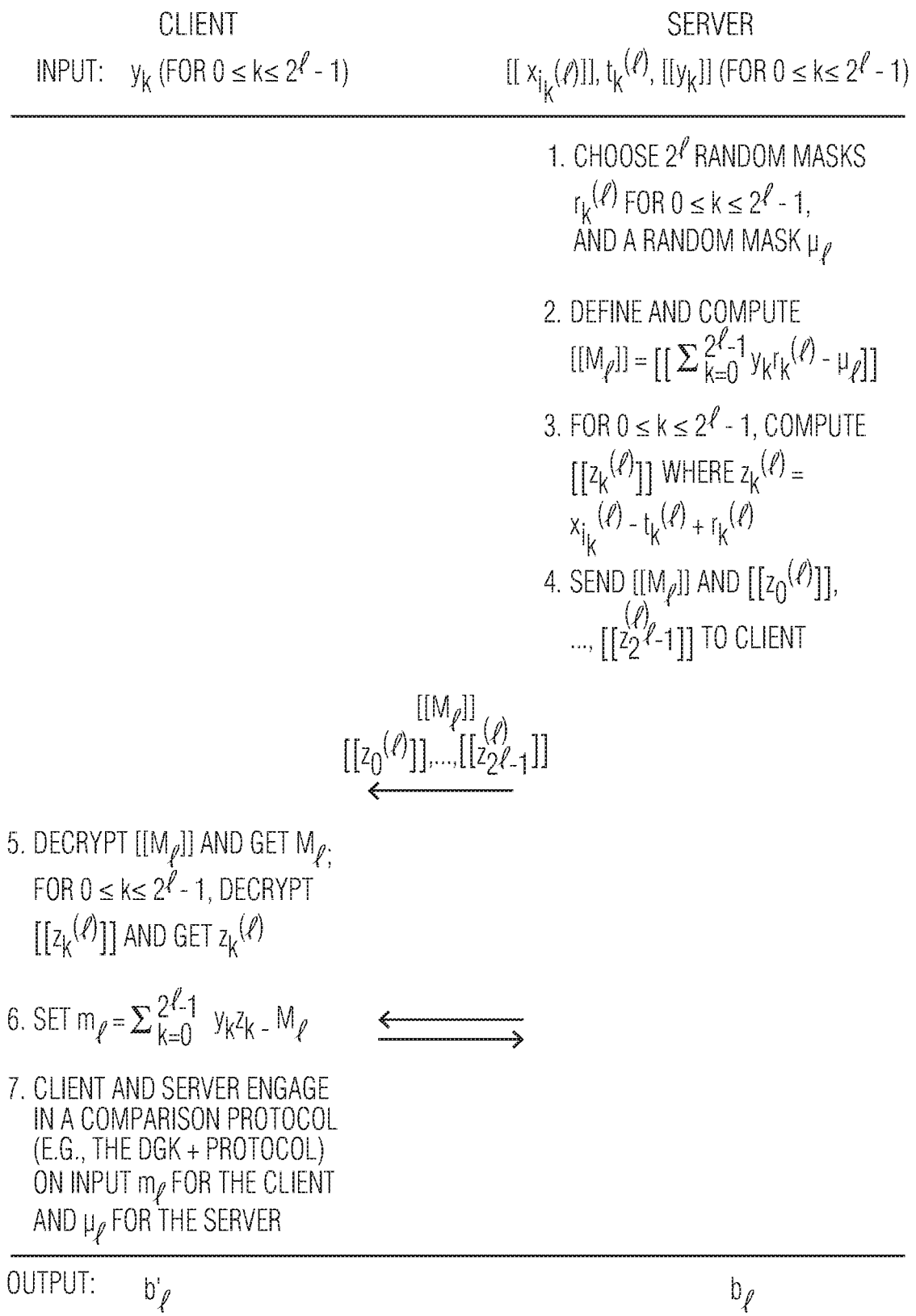
FIG. 1 illustrates an exemplary protocol using additively homomorphic encryption (e.g., Paillier cryptosystem) for performing step 5b.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Privacy-preserving data mining has gained a lot of attention in the last decade. The main goal of these methods is to analyze and extract useful information from the data of the users without accessing the individual's private data. One commonly used machine learning technique is the decision tree. Decision trees are simple classifiers that consist of a collection of decision nodes in a tree structure. It is particularly useful as it can be easily implemented in query-based systems and databases.

In this disclosure, an embodiment of a new protocol to evaluate decision trees in a secure way is disclosed. It is assumed that there is a client with input data $x \in \mathbb{Z}^n$ who wants to evaluate the decision tree $\mathcal{T}: \mathbb{Z}^n \to \mathbb{Z}$. The goal is for the client to learn the output of the decision tree while the server learns nothing about the client's private input.

An embodiment of a privacy preserving decision tree protocol will be described herein that decreases the computational complexity as well as the required bandwidth as compared to the current state-of-the-art. In the previous works in the literature, in order to have privacy for the user's data, the server should implement the comparison protocol for all the internal nodes. The embodiment described here is a new method for decision tree evaluation which only requires one comparison in each level of the decision tree. This results in decreasing the total number of comparisons by a logarithmic factor. This is a worthwhile improvement as performing the comparison protocol usually requires massive amounts of computation and bandwidth.

The new embodiment of the decision tree protocol utilizes an additively homomorphic encryption scheme. Let $[\![m]\!]$ denote the encryption of a message m. The homomorphic property implies that for any two messages m and m', the encryption of m+m' can be obtained from the encryptions of m and m' as $[\![m+m']\!] = [\![m]\!] \cdot [\![m']\!]$. Likewise, for a known constant c, the encryption of c·m can be obtained from the encryption of m as $[\![c \cdot m]\!] = [\![m]\!]^c$.

An efficient additively homomorphic encryption scheme is provided by Paillier cryptosystem. Paillier scheme is defined as follows. On input some security parameter, two large primes p and q are generated. Let N=pq and λ=lcm (p−1, q−1). The public key is pk=N and the secret key is sk=λ. The message space is $\mathcal{M} = \{0, \ldots, N-1\}$.

The encryption of a message $m \in \mathcal{M}$ is given by $C=(1+mN)r^N \bmod N^2$ for some random element $r \in \{1, \ldots, N-1\}$. Writing $C = [\![m]\!]$, the decryption of C is obtained as $$m = \frac{L}{\lambda}$$

mod N where $L=(C^\lambda - 1 \bmod N^2)/N$.

Given $C_1 = [\![m_1]\!]$ and $C_2 = [\![m_2]\!]$, one can obtain the encryption of $m_1 + m_2$ as $[\![m_1 + m_2]\!] = C_1 C_2 r'^N \pmod{N^2}$ for any non-zero integer r'.

Let the server possess the database $x_1, x_2, \ldots, x_n$, and the client has a selection index $i \in \{1, 2, \ldots, n\}$. In a 1-out-of-n oblivious transfer protocol, the client learns only $x_i$ and the server learns nothing.

In a secure comparison protocol there are two parties who want to compare their private data. It is assumed that one party has integer x and the other party has integer y in the clear and they want to compare these numbers (without revealing the value) to check whether x≤y or not. The final result of the comparison will be secretly shared between the two parties.

The DGK+ comparison protocol which was proposed by Damgård, Geisler, and Krøigaard will be used as an example. The setting is as follows. Alice possesses a private t-bit integer $x = \sum_{i=0}^{t-1} x_i 2^i$ and Bob possesses another private t-bit integer $y = \sum_{i=0}^{t-1} y_i 2^i$. The goal for Alice and Bob is to respectively obtain bits $\delta_A$ and $\delta_B$ such that $\delta_A \oplus \delta_B = [x \leq y]$. The protocol proceeds in four steps:

1. Bob encrypts the bits of $y = \sum_{i=0}^{t-1} y_i 2^i$ under his public key and sends $[\![y_i]\!]$, $0 \leq i \leq t-1$, to Alice.
2. Alice chooses uniformly at random a bit $\delta_A \in \{0,1\}$ and defines $s = 1 - 2\delta_A$. Alice also selects t+1 random invertible scalars $r_i$, $-1 \leq i \leq t-1$.
3. Next, for $t-1 \geq i \geq 0$, Alice computes $$[\![c_i^*]\!] = ([\![s]\!] \cdot [\![x_i]\!] \cdot [\![y_i]\!]^{-1} \cdot (\Pi_{j=i+1}^{t-1} [\![x_j \oplus y_j]\!])^3)^{r_i}.$$

Finally, Alice computes $$[\![c_{-1}^*]\!] = ([\![\delta_A]\!] \cdot \Pi_{j=0}^{t-1} [\![x_j \oplus y_j]\!])^{r_{-1}}.$$

Alice sends the t+1 ciphertexts $[\![c_i^*]\!]$ in a random order to Bob.

4. Using his private key, Bob decrypts the received $[\![c_i^*]\!]$'s. If one is decrypted to zero, Bob sets $\delta_B=1$. Otherwise, he sets $\delta_B=0$.

This DGK+ comparison protocol has been improved upon by introducing a new method that reduces both the computational complexity and the communication bandwidth by a factor of two. This comparison protocol is described in copending patent application ser. No. 15/849,420 entitled "PRIVACY PRESERVING COMPARISON" filed Dec. 20, 2017. This improved version along with other privacy preserving comparison protocols may be used in the embodiment described in this disclosure.

Decision tree evaluation is a well-known method in the machine learning community to evaluate the model's output corresponding to a user's input data. In order to evaluate the decision tree $\mathcal{T}$ on the input vector $x \in \mathbb{Z}_n$, when everything is available in the clear, one should traverse $\mathcal{T}$ by doing one comparison for each of the levels of the tree, and finding the leaf node corresponding to x. The value of this leaf node is the output of the model. As one can see, the total number of comparisons in this case is bounded by the depth of the tree $\mathcal{T}$, i.e., the length of the longest path from the root to the leaves.

In David J Wu, Tony Feng, Michael Naehrig, and Kristin Lauter, "Privately evaluating decision trees and random forests," *Proceedings on Privacy Enhancing Technologies,* 2016(4):335-355, 2016, Wu et al. introduced a method for privately evaluating decision trees and random forests. They have proposed a method in which a client can learn the output corresponding to her input value while the server learns nothing. They also showed that by using their protocol the client's data and the server's model remain private. They compared the performance of their secure protocol with the previous works in the literature and showed a 10 times improvement in terms of computations and bandwidth.

In spite of the fact that the method proposed by Wu et al. is secure and has much better performance than the prior art, they still need to perform the comparison protocol for all the internal nodes of the tree. In other words, when the decision tree $\mathcal{T}$ is a complete binary tree of depth d, in their protocol they need to perform $2^d-1$ comparisons to securely compute the output of the model. However, as discussed earlier, when the input and the model are available in the clear one should perform only d comparisons to evaluate the decision tree.

In this disclosure, an embodiment is described for privately evaluating the decision tree with only d comparisons. This embodiment uses the same idea as Wu et al. to permute the tree nodes, whereas it needs to do only one comparison for each level of the decision tree. This is done by letting the client learn the indices of the corresponding internal nodes which appear while traversing the permuted tree. Having the knowledge of the index of the internal node at each level will result in doing one comparison in each level. Note that knowing the indices of the internal nodes in the permuted tree does not reveal any information about the actual decision tree because the nodes at each level are permuted using a random permutation.

Because the comparison protocol requires large amount of computation and bandwidth, our protocol greatly improves previous results in terms of computation and speed, by reducing the total number of comparisons to a logarithmic factor.

The embodiment described herein is fully generic in terms of the encryption scheme and the comparison protocol. Indeed, one can use the embodiment for evaluating a decision tree with the freedom of choosing any encryption scheme that is additively homomorphic, as well as choosing any comparison protocol for comparing the private data of the client and the user.

It is assumed that the server has a decision tree $\mathcal{T}:\mathbb{Z}^n \to \mathbb{Z}$ and the client has a feature vector $x \in \mathbb{Z}^n$. It is assumed that $\mathcal{T}$ is a complete binary tree of depth d. The depth of a tree is the length of the longest path from the root to the leaf. In general, a binary decision tree may not be complete but one can transform any decision tree to a complete tree by introducing dummy internal nodes.

The following rule is used for indexing the nodes of the decision tree $\mathcal{T}$ with depth d:

The nodes at level $\ell$ in the tree are the nodes that have distance $\ell$ from the root of the tree. Therefore, all the internal nodes in $\mathcal{T}$ have level between 0 and d-1;

The $2^\ell$ nodes at level $\ell$ (for $\ell=0, 1, \ldots, d-1$) are indexed from the left to the right by $v_k^{(\ell)}$, with $0 \le k \le 2^\ell-1$, where $v_0^{(\ell)}$ denotes the leftmost node at level $\ell$ and $v_{2^\ell-1}^{(\ell)}$ denotes the rightmost node; and An index from 0 to $2^d-1$ is defined for the leaf nodes. With this indexing scheme, the leaves of the tree, when read from left-to-right, correspond with the ordering $z_0, \ldots, z_{2^d-1}$.

Each internal node $v_k^{(\ell)}$ in the tree is associated with a Boolean function
$$f_k^{(\ell)}(x)=1 \text{ when } \{x_{i_k^{(\ell)}} \le t_k^{(\ell)}\},$$
where $i_k^{(\ell)}$ is an index in the feature vector $x \in \mathbb{Z}^n$, and $t_k^{(\ell)}$ is a threshold. To evaluate the output of the decision tree, one should start from the root and at each level depending on the result of $f_k^{(\ell)}$ take either the left branch (when for example $f_k^{(\ell)}=0$) or the right branch (when for example $f_k^{(\ell)}=1$) of the tree, and repeat the process until a leaf node is reached. The output $\mathcal{T}(x)$ is $z_r$, the value of the so-obtained leaf node.

In order to find the index of the leaf node, r, for the feature vector x, it is necessary and sufficient to know the result of the Boolean comparison at each level of the tree. The embodiment described herein is therefore optimal in the number of comparisons.

It is assumed that the client has a matching public/private key pair (pk, sk) which is used for encryption and decryption of the messages under an additively-homomorphic encryption scheme as described above. Also, as described above, $[\![m]\!]$ is used to denote an encryption of the message m under client's public-key, pk. It is also assumed that the server uses a copied version of the decision tree $\mathcal{T}$, denoted by $\mathcal{T}'$ and performs the permutation on that. An embodiment of the decision tree protocol proceeds as follows:

1. The client encrypts entries of the feature vector $x=(x_1, \ldots, x_n) \in \mathbb{Z}^n$ and sends $[\![x]\!]=([\![x_1]\!], \ldots, [\![x_n]\!])$ to the server.

2. The server defines $\mathcal{T}' \leftarrow \mathcal{T}$. It chooses a random mask $\mu_0$ in the message space and sends $[\![m_0]\!] = [\![x_{i_0}^{(0)} - t_0^{(0)} + \mu_0]\!]$ to the client. Client recovers $m_0$ using private key sk.

3. The client and server perform comparison protocol on $m_0$ and $\mu_0$ and share the result. At the end of the protocol, the client possesses $b'_0 \in \{0,1\}$ and the server has $b_0 \in \{0,1\}$ such that:
$$b_0 \oplus b'_0 = 1\{m_0 \le \mu_0\} = 1\{x_{i_0}^{(0)} \le t_0^{(0)}\}.$$

4. The server chooses a bit $s_0 \in \{0,1\}$ uniformly at random. If $s_0=1$, server switches the left and right subtree of $\mathcal{T}'$, and calls $\mathcal{T}'$ the resulting tree. Server then sends $b_0 \oplus s_0$ to the client, that in turn recovers $\beta_0 = b'_0 \oplus b_0 \oplus s_0$.

5. For $\ell=1, 2, \ldots, d-1$:

(a) The client defines $\beta^{(\ell)}=(\beta_0, \beta_1, \ldots, \beta_{\ell-1})_2 := \sum_{i=0}^{\ell-1} \beta_i 2^{\ell-i-1}$. For $k=0, 1, \ldots, 2^\ell-1$, it sets $y_k = 1\{\beta^{(\ell)}=k\}$ and sends $[\![y_k]\!]$ to server. Note that this definition implies that $y_{\beta^{(\ell)}}=1$ and $y_k=0$ for $k \ne \beta^{(\ell)}$.

(b) The server and client engage in a multi-party computation protocol and secret share the result of the comparison at level $\ell$. At the end of the protocol, the client possesses $b'_\ell \in \{0,1\}$ and the server has $b_\ell \in \{0,1\}$ such that:

$$b_\ell \oplus b'_\ell = 1\left\{\sum_{k=0}^{2^\ell-1} y_k\left(x_{i_k^{(\ell)}} - t_k^{(\ell)}\right) \leq 0\right\}.$$

(c) The server chooses a bit $s_\ell \in \{0,1\}$ uniformly at random. If $s_\ell = 1$, the server switches all the left and right subtrees at level $\ell$ of $\mathcal{T}'$, and calls $\mathcal{T}'$ the resulting tree. The server sends $b_\ell \oplus s_\ell$ to the client, that in turn recovers $\beta_\ell = b'_\ell \oplus b_\ell \oplus s_\ell$.

6. The client computes $r = (\beta_0, \beta_1, \ldots, \beta_{d-1})_2$ which is the index of the leaf node in $\mathcal{T}'$. Next, the client engages in a 1-out-of-$2^d$ oblivious transfer with the server to learn the value of $\mathcal{T}(x)$.

In step 5a in the embodiment described above, letting $y = (y_0, \ldots, y_{2^\ell-1})$, it turns out that $$y = (0, \ldots, 0, 1, 0, \ldots, 0)$$
$$\uparrow$$
$$\beta^{(\ell)} - th \text{ position}$$

namely, y has a single bit set to 1.
As a result, in step 5a, the following results:

$$\sum_{k=0}^{2^\ell-1} y_k\left(x_{i_k^{(\ell)}} - t_k^{(\ell)}\right) = x_{i_{k^*}^{(\ell)}} - t_{k^*}^{(\ell)} \text{ where } k^* = \beta^{(\ell)}$$

and thus $$b_\ell \oplus b'_\ell = \begin{cases} 1 & \text{if } x_{i_{k^*}^{(\ell)}} \leq t_{k^*}^{(\ell)} \\ 0 & \text{otherwise} \end{cases}.$$

The advantage of this approach is that only a single comparison is needed as opposed to the approach of Wu et al. where $2^\ell$ comparisons are performed at level $\ell$. Indeed, at level $\ell$, their proposed method requires the evaluation of $1\{x_{i_k^{(\ell)}} \leq t_k^{(\ell)}\}$ for $0 \leq k \leq 2^\ell - 1$.

Now two detailed implementations the multi-party protocol for step 5b will be presented. The first embodiment makes use of additively homomorphic encryption, and the second embodiment makes use of somewhat homomorphic encryption.

FIG. 1 illustrates an exemplary protocol using additively homomorphic encryption (e.g., Paillier cryptosystem) for performing step 5b.

The steps of this protocol are as follows: After the client computes $y_k$, for $0 \leq k \leq 2^\ell - 1$, and the server receives inputs $[\![x_{i_k^{(\ell)}}]\!]$, $t_k^{(\ell)}$, and $[\![y_k]\!]$, for $0 \leq k \leq 2^\ell - 1$, in step 1, the server chooses $2^\ell$ random masks $r_k^{(\ell)}$ for $0 \leq k \leq 2^\ell - 1$, and a random mask $\mu_\ell$. In step 2, the server defines and computes $[\![M_\ell]\!] = [\![\sum_{k=0}^{2^\ell-1} y_k r_k^{(\ell)} - \mu_\ell]\!]$. In step 3, the server computes for $0 \leq k \leq 2^\ell - 1$ $[\![z_k^{(\ell)}]\!]$ where $z_k^{(\ell)} = x_{i_k^{(\ell)}} - t_k^{(\ell)} + r_k^{(\ell)}$. In step 4, the server sends $[\![M_\ell]\!]$ and $[\![z_0^{(\ell)}]\!], \ldots, [\![z_{2^\ell-1}^{(\ell)}]\!]$ to the client.

In step 5, the client decrypts $[\![M_\ell]\!]$ to get $M_\ell$. In step 6, the client sets $m_\ell = \sum_{k=0}^{2^\ell-1} y_k z_k - M_\ell$. In step 7, the client and server engage in a comparison protocol (e.g., the DGK+ protocol) on input $m_\ell$ for the client and $\mu_\ell$ for the server. The client then outputs $b'_\ell$ and the server outputs $b_\ell$. These output values can then be used as described above in steps 5c and 6 in the decision tree protocol.

Note that $M_\ell$ and $[\![z_k^{(\ell)}]\!]$ may be computed by the client from $[\![x_{i_k^{(\ell)}}]\!]$, $t_k^{(\ell)}$, and $[\![y_k]\!]$ as they satisfy $$[\![M_\ell]\!] = \left(\prod_{k=0}^{2^\ell-1} [\![y_k]\!]^{r_k^{(\ell)}}\right)[\![\mu_\ell]\!]^{-1}$$

and $$[\![z_k^{(\ell)}]\!] = [\![x_{i_k^{(\ell)}}]\!]([\![t_k^{(\ell)}]\!])^{-1}[\![r_k^{(\ell)}]\!].$$

The second embodiment of step 5b that makes use of somewhat homomorphic encryption will now be described. Somewhat homomorphic encryption allows anyone to add encrypted messages as in additively homomorphic encryption. Advantageously it also allows anyone to multiply encrypted messages but just once. An example of such a scheme is the BGN (Boneh-Goh-Nissim) cryptosystem, whose description follows.

On input some security parameter, let $\mathbb{G}$ and $\mathbb{G}_T$ be two cyclic groups of order $n = q_1 q_2$ where $q_1$ and $q_2$ are prime, equipped with a bilinear map e: $\mathbb{G} \times \mathcal{M} \to \mathbb{G}_T$. Let also g, u $\leftarrow \mathbb{G}$ be two random elements in $\mathcal{M}$ and $h = u^{q_2}$. The public key is pk=(n, $\mathbb{G}$, $\mathbb{G}_T$, e, g, h) and the secret key is sk=$q_1$. The message space $\mathcal{M}$ is the set $\{0, 1, \ldots, T\}$ with $T < q_2$.

The encryption of a message $m \in \mathcal{M}$ is given by $C = g^m h^r \in \mathbb{G}$ for some random element $r \in \{0, \ldots, n-1\}$. Define $C = [\![m]\!]$. Noting that $C^{q_1} = (g^m h^r)^{q_1} = (g^{q_1})^m$, the decryption of C is obtained as the discrete logarithm of $C^{q_1}$ with respect to base $g^{q_1}$.

Next, set $G = e(g, g)$ and $H = e(g, h)$. There is another way to define the encryption of a message $m \in \mathcal{M}$. Choose some random element $r \in \{0, \ldots, n-1\}$ and define the encryption of m as $\hat{C} = G^m H^r \in \mathbb{G}_T$. Define $\hat{C} = \langle\langle m \rangle\rangle$. Plaintext message m can then be recovered as the discrete logarithm of $\hat{C}^{q_1}$ with respect to base $G^{q_1}$ using secret key $q_1$.

For the first encryption scheme encrypted messages may be added as follows: Given $C_1 = [\![m_1]\!]$ and $C_2 = [\![m_2]\!]$, anyone can obtain the encryption of $m_1 + m_2$ as $[\![m_1 + m_2]\!] = C_1 C_2 n^{r'}$ for any integer r'.

For the second encryption scheme encrypted messages may be added as follows: Given $\hat{C}_1 = \langle\langle m_1 \rangle\rangle$ and $\hat{C}_2 = \langle\langle m_2 \rangle\rangle$, anyone can obtain the encryption of $m_1 + m_2$ as $\langle\langle m_1 + m_2 \rangle\rangle = \hat{C}_1 \hat{C}_2 H^{r'}$ for any integer r'.

Encrypted messages may be multiplied as follows: Given $C_1 = [\![m_1]\!]$ and $C_2 = [\![m_2]\!]$, anyone can obtain the encryption of $m_1 \cdot m_2$ as $\langle\langle m_1 \cdot m_2 \rangle\rangle = e(C_1, C_2) H^{r'}$ (for any integer r'). It can be verified that $e(C_1, C_2) H^{r'} = G^{m_1 m_2} H^{\tilde{r}}$ for some $\tilde{r}$.

Figure 2:
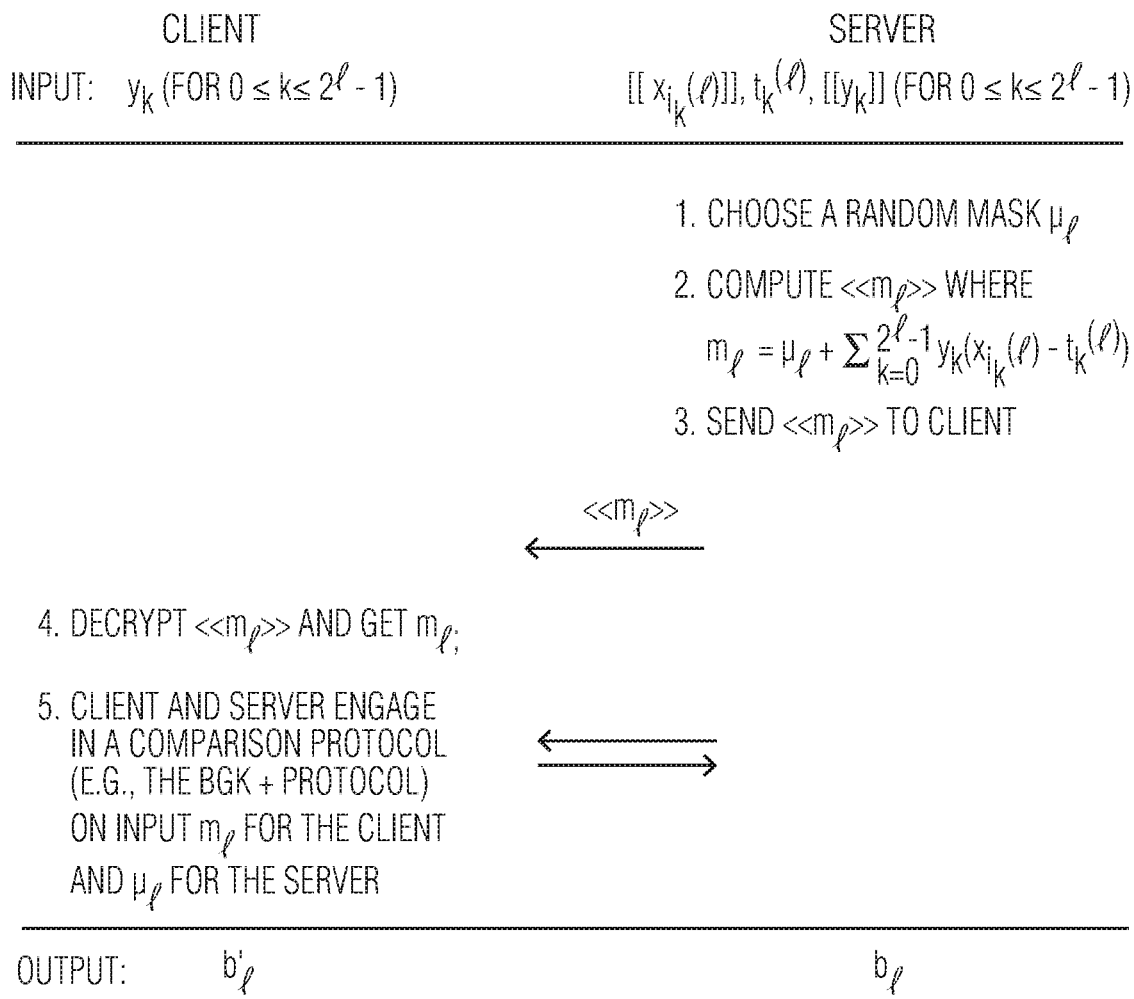
FIG. 2 illustrates an exemplary protocol using somewhat homomorphic encryption (e.g., Boneh-Goh-Nissim cryptosystem) for performing step 5b.

Assuming using a somewhat homomorphic encryption, the multi-party computation protocol for step 5b may proceed as depicted in FIG. 2.

After the client computes $y_k$, for $0 \leq k \leq 2^\ell - 1$, and the server receives inputs $[\![x_{i_k^{(\ell)}}]\!]$, $t_k^{(\ell)}$, and $[\![y_k]\!]$, for $0 \leq k \leq 2^\ell - 1$, in step 1, the server chooses a random mask $\mu_\ell$. In step 2, the server computes $\langle\langle m_\ell \rangle\rangle$ where $m_\ell = \mu_\ell + \sum_{k=0}^{2^\ell - 1} y_k (x_{i_k^{(\ell)}} - t_k^{(\ell)})$. In step 3, the server sends $\langle\langle m_\ell \rangle\rangle$ to the client.

In step 4, the client decrypts $\langle\langle m_\ell \rangle\rangle$ to get $m_\ell$. In step 5, the client and server engage in a comparison protocol (e.g., the DGK+ protocol) on input $m_\ell$ for the client and $\mu_\ell$ for the server. The client then outputs $b'_\ell$ and the server outputs $b_\ell$. These output values can then be used as described above in steps 5c and 6 in the decision tree protocol.

Note that $\langle\langle m_\ell \rangle\rangle$ may be computed by the client from $[\![x_{i_k^{(\ell)}}]\!]$, $t_k^{(\ell)}$, and $[\![y_k]\!]$ as it satisfies $$\langle\langle m_\ell \rangle\rangle = \langle\langle \mu_\ell \rangle\rangle \prod_{k=0}^{2^\ell - 1} e\left([\![y_k]\!], [\![x_{i_k^{(\ell)}}]\!][\![t_k^{(\ell)}]\!]^{-1}\right).$$

Decision trees have various applications in different fields including object recognition, molecular biology, and financial analysis. The embodiments described herein describe a new protocol for decision-tree evaluation and guarantees the privacy of both the user's information and the server's model.

These embodiments have potential applications in the emerging field of cloud computing. In a cloud-based query system, the service provider possesses a model which is developed by integrating the data of thousands of users and the client wants to learn the output of the model for her input data. Currently, such services require having access to the user's information in the clear. However, this information may be very sensitive in certain cases (such as medical data). The embodiments described herein can be a good alternative to be implemented for these applications in a privacy-preserving way.

The embodiments described herein represent an improvement in the technology of the secure evaluation of a decision tree by a party who does not have access to the underlying secure data and another party who does not have access to the specifics of the decision tree. These embodiments provide a reduction in the amount of computations needed to evaluate the decision trees as well as reducing the amount of data needed to be exchanged between the parties engage in evaluating the decision tree. As a result, the embodiments also lead to an improvement in the operation of a computer that may be used to carry out such secure decision tree evaluations.

The methods described above may be implemented in software which includes instructions for execution by a processor stored on a non-transitory machine-readable storage medium. The processor may include a memory that stores the instructions for execution by the processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for performing a secure evaluation of a decision tree, comprising:
   receiving, by a processor of a server, an encrypted feature vector $[\![x]\!] = ([\![x_1]\!], \ldots, [\![x_n]\!])$ from a client, where n is an integer, wherein $[\![x]\!]$ denotes an additively homomorphic encryption of x using a cryptographic key of the second party;
   choosing a random mask $\mu_0$;
   calculating $[\![m_0]\!]$ and sending $[\![m_0]\!]$ to the client, wherein $[\![m_0]\!] = [\![x_{i_0^{(o)}} - t_0^{(0)} + \mu_0]\!]$ and $x_{i_0^{(o)}}$ is the value of entry $i_0^{(o)}$ of the feature vector x ($1 \leq i_0^{(0)} \leq n$), and $t_0^{(0)}$ is a threshold value in the first node in the first level of a decision tree $\mathcal{T}'$;
   performing a comparison protocol on $m_0$ and $\mu_0$, wherein the server produces a comparison bit $b_0$ and the client produces a comparison bit $b'_0$;
   choosing a random bit $s_0 \in \{0,1\}$ and when $s_0 = 1$ switching a left and right subtrees of $\mathcal{T}'$;
   sending $b_0 \oplus s_0$ to the client; and
   for each level $\ell = 1, 2, \ldots, d-1$ of the decision tree $\mathcal{T}'$, where d is the number of levels in the decision tree $\mathcal{T}'$, perform the following steps:
      receiving from the client $[\![y_k]\!]$ where $k = 0, 1, \ldots, 2^\ell - 1$;
      performing a comparison protocol on $m_\ell$ and $\mu_\ell$, wherein $\mu_\ell$ is a random mask and $m_\ell$ is based upon, $[\![x]\!]$, $t_k^{(\ell)}$, $[\![y_k]\!]$, and $\mu_\ell$ and the server produces a comparison bit $b_\ell$ and the client produces a comparison bit $b'_\ell$;
      choosing a random bit $s_\ell \in \{0,1\}$ and when $s_\ell = 1$ switching all left and right subtrees at level $\ell$ of $\mathcal{T}'$; and
      sending $b_\ell \oplus s_\ell$ to the client.

2. The method of claim 1, wherein when the server engages in a 1-out-of-$2^d$ oblivious transfer with the client to learn the value of $\mathcal{T}'(x)$.

3. The method of claim 2, wherein when the client computes $r = (\beta_0, \beta_1, \ldots, \beta_{d-1})_2$ which is the index of the leaf node in $\mathcal{T}'$ indicating the output of the decision tree and where $\beta_\ell = b'_\ell \oplus b_\ell \oplus s_\ell$.

4. The method of claim 1, wherein the first encryption uses the Pallier cryptosystem.

5. The method of claim 1, wherein performing a comparison protocol on $m_\ell$ and $\mu_\ell$, further comprises:
   choosing, by the server, $2^\ell$ random masks $r_k^{(\ell)}$ for $0 \leq k \leq 2^\ell - 1$, and a random mask $\mu_\ell$ computing $[\![M_\ell]\!] = [\![\sum_{k=0}^{2^\ell-1} y_k r_k^{(\ell)} - \mu_\ell]\!]$;

computing for $0 \leq k \leq 2^\ell - 1$ $[\![z_k^{(\ell)}]\!]$ where $z_k^{(\ell)} = x_{i_k^{(\ell)}} - t_k^{(\ell)} + r_k^{(\ell)}$; and sending $[\![M_\ell]\!]$ and $[\![z_0^{(\ell)}]\!], \ldots, [\![z_{2^\ell-1}^{(\ell)}]\!]$ to the client.

6. The method of claim 5, wherein performing a comparison protocol on $m_\ell$ and $\mu_\ell$, further comprises:

decrypting, by the client, $[\![M_\ell]\!]$ to get $M_\ell$; and computing, by the client, $m_\ell = \sum_{k=0}^{2^\ell-1} y_k z_k - M_\ell$.

7. The method of claim 1, wherein performing a comparison protocol on $m_\ell$ and $\mu_\ell$, further comprises:

choosing, by the server, a random mask $\mu_\ell$;

computing $<\!<\!M_\ell\!>\!>$ where $m_\ell = \mu_\ell + \sum_{k=0}^{2^\ell-1} y_k (x_{i_k^{(\ell)}} - t_k^{(\ell)})$, $<\!<\!w\!>\!>$ denotes a second homomorphic encryption of w using a cryptographic key of the second party; and sending $<\!<\!m_\ell\!>\!>$ to the client.

8. The method of claim 7, wherein performing a comparison protocol on $m_\ell$ and $\mu_\ell$, further comprises, decrypting, by the client, $<\!<\!m_\ell\!>\!>$ to get $m_\ell$.

9. The method of claim 7, wherein the second encryption uses the Boneh-Goh-Nissim (BGN) cryptosystem.

10. The method of claim 7, wherein the second encryption uses a homomorphic cryptosystem.

11. The method of claim 1, wherein for each level $s_\ell = 1, 2, \ldots, d-1$ of the decision tree $\mathcal{T}'$ and the client computes $y_k = 1\{\beta_\ell = k\}$, where $\beta_\ell = \sum_{i=0}^{\ell-1} \beta_i 2^{\ell-i-1}$, encrypts $y_k$ resulting in $[\![y_k]\!]$, and sending $[\![y_k]\!]$ to the server.

12. A non-transitory machine-readable storage medium encoded with instructions for performing a secure evaluation of a decision tree, comprising:

instructions for receiving, by a processor of a server, an encrypted feature vector $[\![x]\!] = ([\![x_1]\!], \ldots, [\![x_n]\!])$ from a client, where n is an integer, wherein $[\![x]\!]$ denotes an additively homomorphic encryption of x using a cryptographic key of the second party;

instructions for choosing a random mask $\mu_0$;

instructions for calculating $[\![m_0]\!]$ and sending $[\![m_0]\!]$ to the client, wherein $[\![m_0 = x_{i_0^{(0)}} - t_0^{(0)} + \mu_0]\!]$ and $x_{i_0^{(0)}}$ is the value of entry $i_0^{(0)}$ of the feature vector x ($1 \leq i_0^{(0)} \leq n$), and $t_0^{(0)}$ is a threshold value in the first node in the first level of a decision tree $\mathcal{T}'$;

instructions for performing a comparison protocol on $m_0$ and $\mu_0$, wherein the server produces a comparison bit $b_0$ and the client produces a comparison bit $b'_0$;

instructions for choosing a random bit $s_0 \in \{0,1\}$ and when $s_0 = 1$ switching a left and right subtrees of $\mathcal{T}'$;

instructions for sending $b_0 \oplus s_0$ to the client; and for each level $\ell = 1, 2, \ldots, d-1$ of the decision tree $\mathcal{T}'$, where d is the number of levels in the decision tree $\mathcal{T}'$, perform the following instructions:

instructions for receiving from the client $[\![y_k]\!]$ where $k = 0, 1, \ldots, 2^\ell - 1$;

instructions for performing a comparison protocol on $m_\ell$ and $\mu_\ell$, wherein $\mu_\ell$ is a random mask and $m_\ell$ is based upon $[\![x]\!]$, $t_k^{(\ell)}$, $[\![y_k]\!]$, and $\mu_\ell$ and the server produces a comparison bit $b_\ell$ and the client produces a comparison bit $b'_\ell$;

instructions for choosing a random bit $s_\ell \in \{0,1\}$ and when $s_\ell = 1$ switching all left and right subtrees at level $\ell$ of $\mathcal{T}'$; and instructions for sending $b'_\ell \oplus s_\ell$ to the client.

13. The non-transitory machine-readable storage medium of claim 12, wherein when the server engages in a 1-out-of-$2^d$ oblivious transfer with the client to learn the value of $\mathcal{T}'(x)$.

14. The non-transitory machine-readable storage medium of claim 13, wherein when the client computes $r = (\beta_0, \beta_1, \ldots, \beta_{d-1})_2$ which is the index of the leaf node in $\mathcal{T}'$ indicating the output of the decision tree and where $\beta_\ell = b'_\ell \oplus b_\ell \oplus s_\ell$.

15. The non-transitory machine-readable storage medium of claim 12, wherein the first encryption uses the Pallier cryptosystem.

16. The non-transitory machine-readable storage medium of claim 12, wherein instructions for performing a comparison protocol on $m_\ell$ and $\mu_\ell$, further comprises:

instructions for choosing, by the server, $2^\ell$ random masks $r_k^{(\ell)}$ for $0 \leq k \leq 2^\ell - 1$, and a random mask $\mu_\ell$;

instructions for computing $[\![M_\ell]\!] = [\![\sum_{k=0}^{2^\ell-1} y_k r_k^{(\ell)} - \mu_\ell]\!]$;

instructions for computing for $0 \leq k \leq 2^\ell - 1$ $[\![z_k^{(\ell)}]\!]$ where $z_k^{(\ell)} = x_{i_k^{(\ell)}} - t_k^{(\ell)} + r_k^{(\ell)}$; and instructions for sending $[\![M_\ell]\!]$ and $[\![z_0^{(\ell)}]\!], \ldots, [\![z_{2^\ell-1}^{(\ell)}]\!]$ to the client.

17. The non-transitory machine-readable storage medium of claim 16, wherein instructions for performing a comparison protocol on $m_\ell$ and $\mu_\ell$, further comprises:

instructions for decrypting, by the client, $[\![M_\ell]\!]$ to get $M_\ell$; and instructions for computing, by the client, $m_\ell = \sum_{k=0}^{2^\ell-1} y_k z_k - M_\ell$.

18. The non-transitory machine-readable storage medium of claim 12, wherein instructions for performing a comparison protocol on $m_\ell$ and $\mu_\ell$, further comprises:

instructions for choosing, by the server, a random mask $\mu_\ell$;

instructions for computing $<\!<\!m_\ell\!>\!>$ where $m_\ell = \mu_\ell + \sum_{k=0}^{2^\ell-1} y_k (x_{i_k^{(\ell)}} - t_k^{(\ell)})$, $<\!<\!w\!>\!>$ denotes a second homomorphic encryption of w using a cryptographic key of the second party; and instructions for sending $<\!<\!m_\ell\!>\!>$ to the client.

19. The non-transitory machine-readable storage medium of claim 18, wherein instructions for performing a comparison protocol on $m_\ell$ and $\mu_\ell$, further comprises, instructions for decrypting, by the client, $<\!<\!m_\ell\!>\!>$ to get $m_\ell$.

20. The non-transitory machine-readable storage medium of claim 18, wherein the second encryption uses the Boneh-Goh-Nissim (BGN) cryptosystem.

21. The non-transitory machine-readable storage medium of claim 18, wherein the second encryption uses a homomorphic cryptosystem.

22. The non-transitory machine-readable storage medium of claim 12, wherein for each level $\ell = 1, 2, \ldots, d-1$ of the decision tree $\mathcal{T}'$ the client performs instructions for computes $y_k = 1\{\beta_\ell = k\}$, where $\beta_\ell = \sum_{i=0}^{\ell-1} \beta_i 2^{\ell-i-1}$, instructions for encrypts $y_k$ resulting in $[\![y_k]\!]$, and instructions for sending $[\![y_k]\!]$ to the server.

* * * * *